United States Patent [19]

Knape et al.

[11] 4,181,010

[45] Jan. 1, 1980

[54] INJECTION TIMING NOZZLE

[75] Inventors: Richard S. Knape; Richard A. Moreau, both of Grand Rapids, Mich.

[73] Assignee: General Motors Corporation, Detroit, Mich.

[21] Appl. No.: 920,144

[22] Filed: Jun. 29, 1978

[51] Int. Cl.$^2$ .............................................. G01M 15/00

[52] U.S. Cl. ................................ 73/119 A; 200/82 D

[58] Field of Search ................ 73/119 A; 200/81.9 R, 200/82 D; 123/32 SA

[56] References Cited

U.S. PATENT DOCUMENTS

| | | | |
|---|---|---|---|
| 2,285,711 | 6/1942 | Hartridge | 73/119 A UX |
| 2,691,888 | 10/1954 | Daulby | 73/119 A UX |
| 3,942,366 | 3/1976 | Hofmann | 73/119 A |
| 4,066,059 | 1/1978 | Mayer et al. | 123/32 SA |

*Primary Examiner*—Jerry W. Myracle

*Attorney, Agent, or Firm*—Arthur N. Krein

[57] ABSTRACT

An inwardly opening valve type, fuel injection nozzle is provided with a part or parts thereof electrically insulated relative to its housing and the movable injector valve therein so that when the injector valve is closed an electrical circuit can be completed through the injector valve and housing and when the injector valve is moved to an open position, the continuity of this circuit is broken, By connecting an electrical continuity tester to this circuit, the opening and closing of the injector valve can be detected and can be used to set the timing of a diesel engine.

6 Claims, 3 Drawing Figures

INJECTION TIMING NOZZLE

FIELD OF THE INVENTION

This invention relates to a diesel engine timing device and, in particular, to injection timing nozzles for use in diesel engines.

DESCRIPTION OF THE PRIOR ART

The desirability of a timing mechanism whereby the start of fuel injection and the duration of fuel injection of a fuel injection nozzle, as used in diesel engines, may be quickly and accurately ascertained has been recognized.

To this end various forms of electrical switch arrangements have either been incorporated into fuel injection nozzles or have been mechanically attached thereto for actuation by the injection valve of the nozzle assembly during opening and closing movement thereof. The resulting nozzle structures are, in effect, new forms of fuel injection nozzles, each with a specific separate electrical switch arrangement incorporated therein or thereon, respectively.

SUMMARY OF THE INVENTION

The present invention relates to an otherwise conventional diesel fuel injection nozzle of the inward opening valve type, which nozzle has certain parts thereof electrically insulated from the remainder of the nozzle assembly whereby when the nozzle is connected in an electrical circuit with an electrical continuity tester, a continuous electrical circuit is effected when the injection valve is in a closed position seated against its valve seat and when the injection valve lifts off its seat, injection begins and the continuity of the electrical circuit is broken. In effect, the subject fuel injection nozzle is also operative as an on-off type electrical switch having a fixed contact and a movable contact.

It is, therefore, a primary object of this invention to provide a fuel injection nozzle which is electrically connectable to an electrical continuity tester and which is operable upon opening of its injection valve to break an electrical circuit.

Another object of this invention is to provide an otherwise conventional diesel fuel injection nozzle with certain elements thereof insulated from the other elements thereof whereby the injection nozzle is also operative as an electrical switch.

A further object of this invention is to provide an injection timing nozzle whereby the time of the beginning of fuel injection and the duration of fuel injection in a diesel engine may be quickly and accurately ascertained.

For a better understanding of the invention, as well as other objects and further features thereof, reference is had to the following detailed description of the invention to be read in connection with the accompanying drawings.

DESCRIPTION OF A PREFERRED EMBODIMENT

Figure 1:
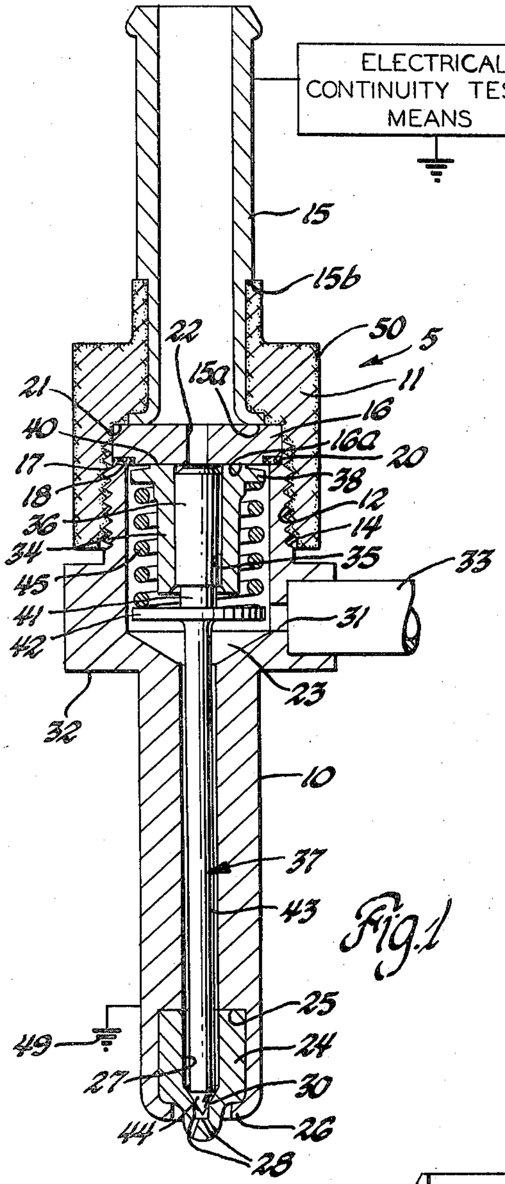
FIG. 1 is a cross-sectional view of a first exemplary embodiment of an injection timing nozzle in accordance with the invention.

Referring first to FIG. 1, the fuel injection timing nozzle 5, in the construction shown, has an injector nozzle housing or body, of generally cylindrical configuration, that includes a spray tip body 10 and an inverted, cup-shaped cap 11 suitably secured together as by having the internal threads 12 of the cap threadedly engaged with the external threads 14 provided on the upper end of the spray tip body 10. The cap 11 is provided with a central stepped bore therethrough to receive the reduced diameter end of a spill tube 15 which is suitably fixed to the cap 11, as by having its lower end spun radially outward to form a flange 15*a*, whereby the cap 11 is thus axially sandwiched between this flange 15*a* and a radial shoulder 15*b* of the spill tube 15.

An abutment or guide spacer 16, in the form of a disc provided with a recessed annular groove 17 adjacent its lower outer peripheral edge, and a washer 18 received in this groove are sealingly sandwiched between the upper rim 20 of the spray tip body 10 and an internal, annular shoulder 21 of the cap 11 and, in abutment against the flange 15*a* of the spill tube for a purpose to be described hereinafter. A central aperture 22 through the guide spacer 16 is used to effect communication between the spill tube 15 on one side thereof and the chamber 23 formed on the opposite side of the guide spacer 16 by this spacer and the axial stepped bore through the spray tip body 10.

In the construction shown, the spray tip body 10 has an injector tip 24 suitably secured to its lower end, as by having this spray tip 24 sandwiched between an internal shoulder 25 of the body and the flange 26 formed by inwardly swagging over lower end of the spray tip body 10. Injector tip 24, as thus positioned, has an axial passage 27 which is in communication at one end with the lower or reduced diameter end of fuel chamber 23 and which is in communication at its other end with one or more spray orifices 28. The spray tip 24 is also provided with an annular valve seat 30 located in the passage 27 upstream of the spray orifices 28, in terms of the direction of fuel flow through the passage 27 to these spray orifices.

Spray tip body 10 is provided with a radial inlet port 31 located above the external mounting abutment shoulder 32 of this body, with this inlet port 31 opening at one end into the fuel chamber 23 and being in flow communication at its other end with a conventional conduit coupling 33 that is suitably secured to the spray tip body 10, as by being welded thereto, whereby the injection nozzle can be connected to a conventional fuel injection pump, not shown, that is operative for delivering fuel under predetermined pulsating pressure.

Located within the upper end of fuel chamber 23 and laterally spaced from the internal wall of the spray tip body 10 defining this portion of the fuel chamber is a sleeve or bushing 34 having a central guide stem bore 35 therethrough for slidably engaging and supporting the upper, enlarged, predetermined diameter stem end 36 of an inward opening, needle type injection valve, generally designated 37.

The upper enlarged end of the bushing 34 provides an external radial flange 38 having an annular valve rim 40 at its upper end of suitable, predetermined diameter whereby to encircle the aperture 22 at a distance radially outward thereof so that, when the bushing 34 is in the position shown with its valve rim 40 in abutment against the lower surface 16*a* of the guide spacer 16, it will be operative to act as a valve to block direct fluid communication between the interior of the spill tube 15 and the chamber 23.

In the construction shown, the injection valve 37 includes the upper enlarged diameter stem end 36, an intermediate reduced diameter stem portion 41, of predetermined diameter, connecting the stem end 36 to an enlarged radial flange or collar 42 and, an elongated stem 43, also of predetermined diameter, depending from collar 42 to terminate at a conical valve tip 44 of a size and configuration so as to sealingly engage the valve seat 30.

A coil spring 45, of a predetermined spring load or force, is positioned in the chamber 23 to loosely encircle the lower end of the bushing 34 with one end thereof in abutment against the underside of the flange 38 of bushing 34 and with its opposite end in abutment against the collar 42 of the injection valve 37. Spring 45 thus acts as a biasing means to normally maintain the bushing 34 closed against the lower surface 16*a* of guide spacer 16 and, the injection valve 37 closed against its valve seat 30 upstream of the spray orifices 28.

With the injection valve 37 in its closed position, as shown, a spacing exists between the upper end of the stem end 36 of the injection valve 37 and the lower surface 16*a* of the guide spacer 16, the axial extent of this spacing limiting the maximum extent of injection valve 37 opening. For this purpose, the axial extent of bushing 34 is preselected so as to provide a spacing of a larger axial extent between the lower end of this bushing and the collar 42 of the injection valve 37.

The nozzle 5, as thus far described, is of conventional construction and, for example, is similar in construction to the type nozzle assembly shown in U.S. Pat. No. 2,985,378 entitled "Accumulator Type Injection Apparatus," issued May 23, 1961 to Robert F. Falberg except that in the subject nozzle 5, as shown, it is provided with a conduit coupling 33 whereby the chamber 23 can be intermittently supplied with pressurized fuel and it is provided with a spill tube 15 wherein any fuel leaking past the movable mating surface of the stem end 36 of the injection valve 37 and the guide stem bore 35 in the bushing 34 can flow through the aperture 22 in the guide spacer 16 into this spill tube 15 for return to a fuel reservoir, not shown, in a conventional manner known in the art.

As is well known, the elements of fuel injection nozzles of this type are normally made of suitable hard and strong materials, such as steel, which are capable of withstanding the normal working pressures and temperatures such nozzles are subjected to as used in diesel engines. Normally these materials, such as steel, used in these injection nozzles are also electrically conductive.

Now in accordance with the invention, a part or parts of such an otherwise conventional fuel injection nozzle are made so as to be electrically insulated relative to the remaining electrically conductive components or parts of the assembly whereby the nozzle can then also be operative as an electrical switch.

Thus with reference to the embodiment shown in FIG. 1, the cap 11 and the washer 18, in accordance with the invention, are used to electrically insulate the electrically conductive spill tube 15 from the electrically conductive spray tip body 10 and to also electrically insulate the electrically conductive guide spacer 16 from the spray tip body 10, respectively.

For this purpose, the cap 11 and washer 18 may be made of a suitable hard, electrically insulating material or, as shown, they may be made of an otherwise conductive metal and then provided on their surfaces with an integral insulating layer 50. For example, in the particular construction shown, both the cap 11 and the washer 18 are made of aluminum with the inner and outer surfaces of each of these parts anodized whereby there is provided an outer aluminum oxide layer, produced in a known manner, on each part which is operative to serve as the integral insulating layer 50 of that part.

With the injection timing nozzle 5 of FIG. 1 thus constructed, a conventional electrical test circuit such as the conventional electrical continuity tester means, shown schematically and generally designated 51, can be electrically connected between the spill tube 15 and the spray tip body 10. The electrical continuity tester means 51 is only shown schematically since the details of such a device are not deemed necessary to an understanding of the subject invention and since such devices are well known in the art. As is well known, such devices normally include, as part of the circuit thereof, a source of electrical energy, which when used on a vehicle may be the storage battery, not shown, of the vehicle, that is used to power or operative, as desired, a signaling device, such as a lamp or the like, an alarm or some other form of signal or indicator device.

The circuit of the electrical continuity tester means 51 may be such that the signaling device is energized when there is a closed electrical circuit, the signaling device is energized only when the circuit being tested is broken or alternately the signaling device is momentarily energized both when the circuit is broken and again when the continuity of the circuit is again completed. The latter type arrangement is preferred for use with the subject injection timing nozzle, since both the start and end of injection will be indicated during operation of the nozzle in the manner to be described.

Again referring to FIG. 1, it will be apparent that with the injection valve 37 in its closed position, as shown, and with the electrical continuity tester means 51 electrically connected to the spill tube 15 and to the spray tip body 10, an electrical circuit is completed via the spill tube 15 engaging the guide spacer 16, bushing 34 engaging guide spacer 16, bushing 34 and spring 45 engaging injection valve 37 and then injection valve 37 seated against the valve seat 30 and therefore engaging the spray tip body 10 and then via ground 49 back to the electrical continuity tester means 51.

However, upon the admission of fuel at high pressure into the chamber 23, as intermittently supplied by a supply pump, not shown, via conduit coupling 33, this fuel under pressure acting on the differential area of the injection nozzle 37 will cause it to move to an open position, that is, to move axially upward with reference to FIG. 1 against the bias of spring 45, causing its valve tip 44 to raise off the valve seat 30 whereby to permit fuel under pressure in chamber 23 to be discharged out through the spray orifices 28.

Since both the cap 11 and guide spacer 16 electrically insulate the spill tube 15 from the spray tip body 10, when the valve tip 44 of the injection valve 37 lifts off the valve seat, the previously described electrical connection between the spill tube 15 and the spray tip body 10 when the injection valve 37 is in its closed position is now broken. This, of course, breaks the electrical continuity of the electrical circuit and this discontinuity will then be indicated by the signaling device of the electrical continuity tester means 51.

At the end of an injection cycle when the pressure of fuel in chamber 23 has decreased to a predetermined value, the spring 45 will then be operative to again bias the injection valve 37 to its closed position against the valve seat 30 and thereby to again effect a closure of the electrical circuit by electrically connecting the spill tube 15 to the spray tip body 10 via the injection valve 37 in the manner described, this occurrence of this event being signaled by the signaling device of the electrical continuity tester means 51. It is thus apparent that the injection timing nozzle 5 is operative as an electrical on-off switch in the described electrical circuit, the switch being in its on position when the injection valve 37 is in its closed position and being in its off position when the injection valve 37 is in its open position permitting discharge of fuel out through the spray orifices. With this arrangement, the spray tip body 10 serves as the fixed contact while the injection valve 37 serves as the movable contact of this electrical switch structure.

Figure 2:
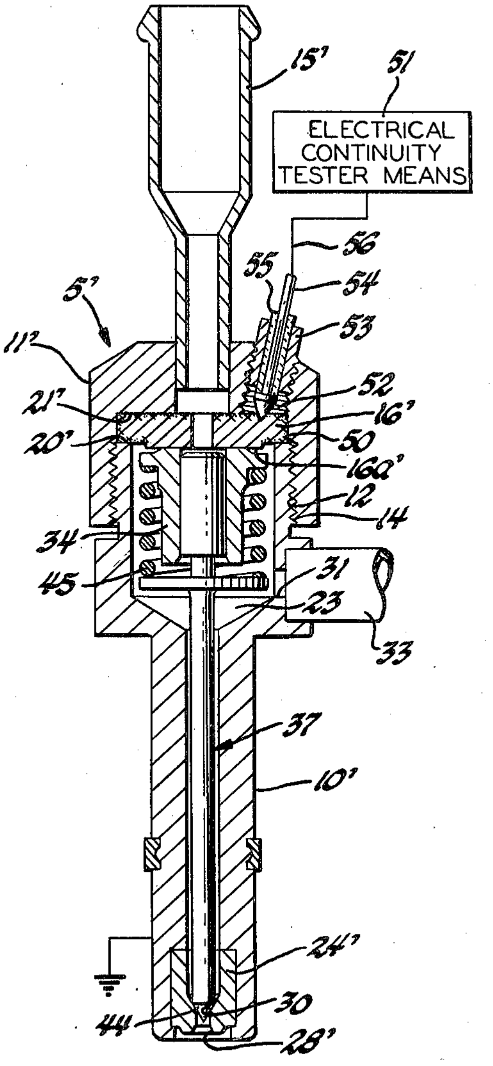
FIG. 2 is a cross-sectional view of a second exemplary embodiment of an injection timing nozzle in accordance with the invention; and, FIG. 3 is a cross-sectional view of a portion of a third exemplary embodiment of an injection timing nozzle in accordance with the invention.

An alternate embodiment of an injection timing nozzle, generally designated 5', in accordance with the invention is shown in FIG. 2 wherein similar parts are designated by similar numerals but with the addition of a prime (') where appropriate. As shown, the injection timing nozzle 5' is structurally and functionally similar to the nozzle 5, except for having but a single spray orifice 28' in the injector tip 24' at the lower end of its spray tip body 10'. In this alternate embodiment, the cap 11' of this nozzle assembly is made of electrically conductive material, such as steel, but the abutment or guide spacer 16' thereof, in the construction shown, is made of aluminum and at least the outer surfaces thereof, except for its lower surface 16a' engaged by the bushing 34, is anodized whereby this element is provided with an integral insulating, aluminum oxide surface layer 50.

To permit connection of an electrical continuity tester means 51 to this injector timing nozzle 5', the cap 11' is provided with an internally threaded aperture 52 through the base thereof at a position radially outward from the spill tube 15'. This threaded aperture is adapted to receive a hollow hex head screw 53 that is used to secure and effect penetration of the sharp point of a metal conductor probe 54 operatively connected by an electrical conduit 56 to a suitable electrical continuity tester means 51. A flanged insulator bushing 55 is positioned to encircle the probe 54 whereby to electrically insulate it from the screw 53 and therefore from cap 11'. With this arrangement, the sharp point of the probe 54 can be forced through the aluminum oxide insulating layer 50 on the upper surface of the guide spacer 16' to effect electrical contact with the conductive aluminum body portion of this member. Since the lower surface 16a' of the guide spacer 16' is not provided with an anodized surface, an electrical connection is effected between the probe 54 and the body of guide spacer 16' to the injection valve 37 via the bushing 34 and spring 45.

Thus in this nozzle 5' structure, when its injection valve 37 is in its closed position with the valve tip 44 thereof seated against valve seat 30 of injector tip 24', an electrical circuit is completed through the injection timing nozzle 5' and, when the injection valve 37 is lifted off this valve seat 30 effecting start of injection, the circuit is broken and this occurrence will then be signaled by the signaling device of the electrical continuity tester means 51. As in the previously described embodiment, when the injection valve 37 is again seated at the termination of injection, this will again complete the electrical circuit which event will also be signaled by the electrical continuity tester means 51.

Figure 3:
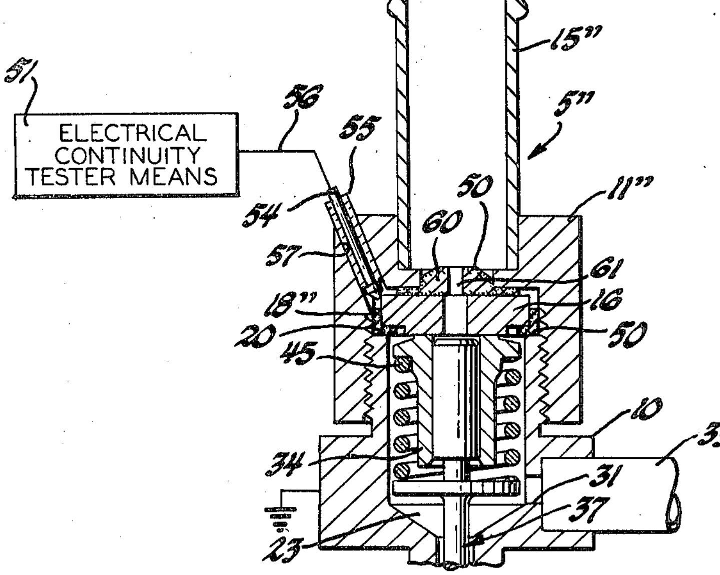

Another alternate embodiment of an injection timing nozzle, generally designated 5", in accordance with the invention is shown in FIG. 3, wherein similar parts are designated by similar numerals but with the addition of a double prime (") where appropriate. In the embodiment of the injection timing nozzle 5", the cap 11" thereof can be made of a conductive material, but in this embodiment the injection nozzle 37 is effectively insulated from the spray tip body 10 and cap 11" when in its raised, open position by means of a centrally apertured 61 insulator washer button 60 that is sandwiched between the upper surface of the guide spacer 16 and by means of an insulator 18" of cup-shaped configuration, that encircles the lower end of the guide spacer and which is sandwiched between the guide spacer 16 and the upper rim 20 of the spray tip body 10.

Both the insulator washer button 60 and insulator washer 18' can be made of a suitable hard insulating material or alternately, if desired, they can be made of a conductive material having an outer integral insulating coating or layer thereon. In the particular construction shown, both the insulator button 60 and insulator washer 18' are both made of aluminum and each has the outer surfaces thereof anodized so as to provide an insulating aluminum oxide layer 50' thereon.

To effect an electrical connection between an electrical continuity tester means 51 and the injection valve 37 of the nozzle 5", its cap 11" is provided with a side aperture 57 that is aligned with an unprotected portion of the guide spacer 16 of this nozzle 5", whereby a conductive probe 54 connected to one end of the tester means 51 can be inserted to effect a circuit connection to this guide spacer 16, the other end of the tester means 51 being electrically connected to the spray tip body 10 of this nozzle 5". Preferably, an insulator bushing 55, as shown, is positioned to encircle the probe 54 intermediate the ends thereof whereby this probe will not contact the cap 11".

With the electrical continuity tester means 51 operatively connected in series connection between the guide spacer 16 and the spray tip body 10 of the injection timing nozzle 5", this nozzle like the nozzles 5 and 5' will effect with the electrical continuity tester means 51 a continuous electrical circuit when the injection nozzle 37 is in its closed or seated position and when the injection nozzle 37 is in its open or lifted position, this circuit will be broken.

When the subject type fuel injection nozzle is used as one of the injector nozzles is a diesel engine, the signaling device of the electrical continuity tester means 51, preferably has a signaling device in the form of a suitable lamp, such as a strobe light, not shown, which can be positioned so as to illuminate a suitable timing indicia on a convenient movable portion of the engine whereby the start of injection from the subject injection timing nozzle can be timed relative to the top dead center position of the cylinder associated with the injector whereby to permit the operator to effect desired timing of the engine in a well known manner.

While the subject invention has been disclosed as applied to a specific form of fuel injection nozzle, it will be apparent to those skilled in the art that most inwardly opening type valve actuated fuel injection nozzles can be readily modified in the manner disclosed whereby such nozzles will then also be operative as an electrical on-off switch for use in an electrical circuit whereby such a modified nozzle would be usable as an injection timing nozzle.

The embodiments of the invention in which an exclusive property or privilege is claimed are defined as follows:

1. A fuel injection nozzle including a nozzle housing having a spray tip body of electrically conductive material at one end thereof and operatively connectable to one end of an electrical test circuit, said nozzle housing having an inlet for pressurized fuel, a spray outlet means at the free end of said spray tip body and a valve seat in said spray tip body next adjacent said spray outlet means; an injection valve of electrically conductive material positioned in said nozzle housing for movement between a closed position at which said injection valve engages said valve seat and an open position at which said injection valve is lifted off said valve seat; and spring means including a spring and an abutment means fixed to said nozzle housing with said spring being operatively connected to said abutment housing means and to said injection valve to normally bias said injection valve to said closed position, said abutment means being operatively connectable to the opposite end of an electrical test circuit and includes an insulating means operatively positioned to electrically insulate a portion of said abutment means from said nozzle housing whereby to operatively insulate said spray tip body from said injection valve when said injection valve is in said open position whereby said injection valve is operable as the movable contact of an electrical switch with said spray tip body serving as the fixed contact of the electrical switch.

2. A fuel injection nozzle according to claim 1, wherein said nozzle housing further includes a cap means having a spill tube extending therefrom fixed to the end of said spray tip body opposite said spray outlet means, said abutment means being of electrical conductive material and having a central through aperture therein and said spring means further includes a bushing of electrical conductive material having a central guide bore therethrough slidably receiving the end of said injection valve opposite said valve seat, said spring being operatively connected to said bushing to normally bias it into seating contact with one side of said abutment means.

3. A fuel injection nozzle according to claim 2 wherein said cap means includes insulating means to electrically insulate said spill tube from said spray tip body, said abutment means being electrically conductive, said spill tube being electrically conductive and positioned to abut the opposite side of said abutment means whereby said injection valve is operatively connectable to the electrical test circuit via said bushing, said abutment means and said spill tube.

4. A fuel injection nozzle according to claim 2 wherein said insulating means is a layer of insulating material covering all but the said one side of said abutment means engaged by said bushing, and wherein said cap means has an aperture therethrough aligned with a portion of said abutment means whereby an electrical probe having a sharp point thereon of an electrical test circuit can be inserted through said aperture to penetrate said layer of insulating material to effect an electrical connection with the conductive material of said abutment means.

5. A fuel injection nozzle according to claim 2 wherein said insulating means includes insulating washers positioned on opposite sides of said abutment means whereby said abutment means is positioned between and electrically insulated from said cap means and said spray tip body and wherein said cap means has an aperture therethrough whereby an electrical connection can be made from said abutment means to the opposite end of the electrical test circuit.

6. A fuel injection timing nozzle including a nozzle housing, of electrical conductive material, providing a fluid passage means and a spray outlet at one end; said nozzle housing having a fuel inlet in communication with said fluid passage means, a valve seat in said nozzle housing encircling said spray outlet, an injection valve of electrical conductive material positioned in said nozzle housing for movement between a closed position at which said injection valve engages said valve seat and an open position at which said injection valve is out of engagement with said valve seat, an abutment means and an insulator means fixed to said nozzle housing with said insulator means positioned to electrically insulate said abutment means from said nozzle housing, spring means operatively connected to said abutment means and to said injection valve to normally bias said injection valve to said closed position and, an electrical continuity tester means operatively connected to said nozzle housing and to said abutment means whereby, when said injection valve is in said closed position engaging said valve seat a closed electrical circuit is effected and when said injection valve is in said open position the continuity of said electrical circuit is broken and indicated by said electrical continuity tester means.

* * * * *